United States Patent [19]

Gallas

[11] Patent Number: 5,116,884
[45] Date of Patent: May 26, 1992

[54] MELANIN HYDROPHILIC CONTACT LENSES

[75] Inventor: James M. Gallas, San Antonio, Tex.

[73] Assignee: Photoprotective Technology Incorporated, San Antonio, Tex.

[21] Appl. No.: 459,749

[22] PCT Filed: Aug. 18, 1988

[86] PCT No.: PCT/US88/02859

§ 371 Date: Feb. 16, 1990

§ 102(e) Date: Feb. 16, 1990

[87] PCT Pub. No.: WO89/01639

PCT Pub. Date: Feb. 23, 1989

Related U.S. Application Data

[63] Continuation-in-part of Ser. No. 88,029, Aug. 18, 1987, abandoned, and a continuation-in-part of Ser. No. 105,632, Oct. 5, 1987, abandoned, and a continuation-in-part of Ser. No. 105,631, Oct. 5, 1987, abandoned, which is a continuation-in-part of Ser. No. 739,556, May 30, 1985, Pat. No. 4,698,374, which is a continuation-in-part of Ser. No. 618,745, Jun. 8, 1984, abandoned, said Ser. No. 105,631, is a continuation-in-part of Ser. No. 88,029, which is a continuation of Ser. No. 837,852, Mar. 6, 1986, abandoned, which is a continuation of Ser. No. 739,756, May 30, 1985, abandoned, which is a continuation of Ser. No. 618,745, said Ser. No. 105,632, is a continuation-in-part of Ser. No. 88,029.

[51] Int. Cl.$^5$ .................................................. C08J 3/00
[52] U.S. Cl. ..................... 523/106; 359/350; 359/361; 252/588; 252/582; 252/587; 424/429; 428/412; 428/441; 527/201; 527/202; 527/203; 8/507; 8/509; 8/512; 8/678; 8/673

[58] Field of Search ................. 523/106; 350/1.1, 1.2, 350/1.7; 252/582, 587, 588; 528/205, 206, 392; 526/238.1, 259, 314; 424/429; 428/412, 441; 527/201, 202, 203; 8/507, 509, 512, 678, 673

[56] References Cited

U.S. PATENT DOCUMENTS

| | | | |
|---|---|---|---|
| 2,822,339 | 2/1958 | Hagemeyer, Jr. et al. | 526/238.1 |
| 3,322,719 | 5/1967 | Pielstocker | 350/1.1 |
| 3,764,477 | 9/1973 | Lehmann et al. | 527/201 |
| 4,404,257 | 9/1983 | Olson | 428/412 |
| 4,419,405 | 12/1983 | Ashby et al. | 428/412 |
| 4,464,525 | 8/1984 | Vance | 528/392 |
| 4,650,605 | 3/1987 | Vance | 252/589 |

FOREIGN PATENT DOCUMENTS

| | | |
|---|---|---|
| 1389087 | 1/1965 | France . |
| 9071149 | 10/1974 | Japan . |
| 1060780 | 3/1967 | United Kingdom . |

OTHER PUBLICATIONS

Today–San Antonio.
The Merck Index (10th Edition pp. 266, 827 and 1154).
Hackh's Chemical Dictionary (4th Edition) pp. 413 and 698.
Organic Chemistry, pp. 428, 429, 576, 577 and 579.

Primary Examiner—Joseph L. Schofer
Assistant Examiner—Alex H. Walker
Attorney, Agent, or Firm—A. Triantaphyllis

[57] ABSTRACT

A hydrophilic contact lens is disclosed incorporating melanin that protects the eye from harmful radiation and superoxide.

35 Claims, 8 Drawing Sheets

MELANIN HYDROPHILIC CONTACT LENSES

RELATED APPLICATIONS

This application is a continuation-in-part application of application Ser. No. 07/105,631, filed Oct. 5, 1987, now abandoned, which is a continuation-in-part application of application Ser. No. 06/739,556, filed May 30, 1985, now U.S. Pat. No. 4,698,374, which in turn was a continuation-in-part application of application Ser. No. 06/618,745, filed Jun. 8, 1984, now abandoned. Application Ser. No. 07/105,631 is also a continuation-in-part application of application Ser. No. 07/088,029, filed Aug. 18, 1987, now abandoned, which in turn is a file wrapper continuation application of application Ser. No. 06/837,852, filed Mar. 6, 1986, now abandoned, which in turn is a file wrapper continuation application of application Ser. No. 06/739/756, filed May 30, 1985, now abandoned, which in turn is a file wrapper continuation application of application Ser. No. 06/618,745, filed Jun. 8, 1984, now abandoned. This application is also a continuation-in-part application of application Ser. No. 07/088,029. This application is also a continuation-in-part application of application Ser. No. 07/105,632, filed Oct. 5, 1987, now abandoned, which is a continuation-in-part application of application Ser. No. 07/088,029.

This application is related to application Ser. No. 07/497,743, filed Mar. 19, 1990, now U.S. Pat. No. 5,036,115, which is a file wrapper continuation application of application Ser. No. 07/088,029. This application is also related to copening application Ser. No. 07/614,062, filed Nov. 9, 1990, which is a file wrapper continuation application of application Ser. No. 07/255,905, filed Oct. 6, 1988, now abandoned, which in turn is a continuation-in-part application of application Ser. No. 07/105,632. This application is also related to copening application Ser. No. 07/454,094, filed Dec. 19, 1989, which is a continuation-in-part application of applications Ser. No. 07/088,029, Ser. No. 07/105,631, Ser. No. 07/105,632 and Ser. No. 07/255,905. This application is also related to copening application Ser. No. 07/453,023, filed Dec. 20, 1989, which is a file wrapper continuation-in-part application of application Ser. No. 07/105,632.

TECHNICAL FIELD

The present invention relates to the field of opthalmic devices and, more particularly, to hydrophilic contact lenses commonly known as hydrogel or soft contact lenses. Still more particularly, the present invention relates to a hydrophilic contact lens incorporating melanin that protects the eye from harmful radiation and superoxides.

BACKGROUND OF THE INVENTION

Radiation emitted from artificial or natural sources is one of the major causes of opthalmic damage including formation of cataracts and tissue damage in the retina, the lens and the cornea. It is believed that a portion of the damage to the cornea and probably the lens is attributed to superoxide being formed in the cornea as a result of the reaction of oxygen with biological molecular units of the cornea being brought to an electronically excited state by light reaching the cornea.

With respect to retinal damage and cataract formation, it is known that, although the cornea and the lens of the eye absorb a large portion of the ultra-violet rays emitted from the radiation source, a substantial portion of the radiation in the range of wavelengths between 400 and 550 nanometers reaches the retina and causes photochemical damage. The amount and severity of the damage increases exponentially as the wavelength of the radiation decreases towards 400 nanometers. The correlation between retinal damage and wavelength is defined herein as the action spectrum for retinal damage.

In the past, various opthalmic devices were developed to absorb radiation. Although some of those devices were able to filter out ultra-violet radiation, most of those devices cut out the ultra-violet wavelengths abruptly as do cut off filters, while allowing radiation between the wavelengths of 400 and 550 nanometers to go through and adversely affect the eye. Furthermore, nobody has attempted to reduce the effects of the superoxide being formed in the cornea and the vicinity thereof.

The present invention discloses an apparatus and a method for absorbing radiation throughout the ultra-violet, visible and infra-red region, including radiation in the wavelengths between 400 and 550 nanometers. Furthermore, it discloses an apparatus and a method for absorbing radiation throughout the entire ultra-violet, visible and infra-red spectrum with the amount of radiation being absorbed increasing as the wavelength increases whereby the absorption is proportionately higher in the regions wherein the effect of radiation is more harmful. Furthermore, the present invention discloses a method and apparatus for reducing the perceived harmful effects of superoxides present in the cornea by scavanging those superoxides. The apparatus and method utilize a hydrophilic contact lens which includes melanin in a non-aggregated form. The melanin provides an absorption spectrum throughout the entire ultra-violet, visible and infra-red region which is similar to the action spectrum for retinal damage. Furthermore, the melanin scavanges the peroxide that is present in the vicinity of the cornea and prevents it from adversely reacting with excited biological tissue. Although melanin has been disclosed in the past as a sunscreen mixed in a cosmetic cream applied to the skin in Japanese Patent 74 71,149 to Kokai, that melanin was in aggregated form and not suitable for the apparatus and the method of the present invention.

These and other advantages of the present invention will become apparent from the following description and drawings.

SUMMARY OF THE INVENTION

A hydrophilic contact lens is disclosed. The lens contains melanin that absorbs radiation throughout the entire ultra-violet, visible and infra-red spectrum with the amount of absorption being uniformly increased as the wavelength of the radiation decreases. Accordingly, the amount of absorption of radiation by the lens continuously increases as the amount and severity of potential harm to the eye increases. Furthermore, the melanin scavanges superoxide anions that are present in the vicinity of the cornea of the eye, thereby acting as a superoxide dismutase. Unless it is scavanges, superoxide may have a harmful effect on the eye by damaging the tissue.

The lens is prepared by polymerizing well known hydrophilic monomers. The melanin is incorporated into the lens by either adhering it to the surface of the lens or by incorporating it into the matrix of the lens. One method of preparing the melanin-containing lens entails first, the separate preparation of the melanin and of the clear hydrophilic lens without the melanin followed by the step of adhering the melanin to the lens by physical or chemical means. It is preferred, that the adherence of the melanin to the lens be accomplished by direct or indirect chemical covalent bonding between the melanin and certain hydrophilic exoskeletal functional groups that are present on the backbone of the polymeric lens. Another method for preparing the melanin-containing hydrophilic lens entails the physical or chemical combination of separately prepared melanin with a monomer suitable for the preparation of a hydrophilic lens, followed by the free-radical polymerization of the monomer to form the melanin-containing hydrophilic lens having non-aggregated melanin uniformly dispersed in the lattice of the lens. Like the previous method, it is preferred that the melanin and the monomer be combined via a chemical covalent bond, directly or indirectly, through appropriate nucleophilic and electrophilic functional groups. Still another method for preparing the melanin containing contact lens entails the copolymerization of a hydrophilic monomer and a melanin precursor by a free-radical initiator.

BRIEF DESCRIPTION OF THE DRAWINGS

For a detailed description of the present invention, reference will now be made to the accompanying drawings wherein.

DETAILED DESCRIPTION OF THE INVENTION

According to the present invention, a hydrophilic contact lens is disclosed that includes melanin for protecting the eye by acting as a superoxide dismutase agent and by filtering out or absorbing ultra-violet, visible and near infrared radiation. As a result, photochemical damage to the retina, the lens and the cornea of the eye is reduced. The lenses may be prepared with or without an optical prescription for correcting visual defects. Furthermore, the lens may be prepared for either an external or intraocular application.

It is well known that, although the cornea and the lens of the eye absorb most of the damaging rays of the sun or other natural or artificial sources of radiation, including rays belonging in the ultra-violet region, there is a considerable amount of radiation in the wavelength ranging from between 400 and 550 nanometers which reaches the retina and causes photochemical damage. It is also well known that the magnitude and the severity of the damage is increased exponentially as the wavelength of radiation is decreased towards 400 nanometers.

In describing this invention the terms "absorbance", "optical density" or "absorption" are used herein to describe the same property of melanin or melanin hydrophylic contact lenses and, therefore, those terms are the same and are used interchangeably to describe such property. It should be understood that the terms absorbance, optical density or absorption are defined by those skilled in the art as the product of the multiplication of concentration of absorbing material times absorptivity times optical path length. In mathematical terms, this relationship is described and used herein as follows:

Absorbance = Optical Density = Absorption = (concentration of absorbing material) × (absorptivity) × (optical path length)

Figure 1:
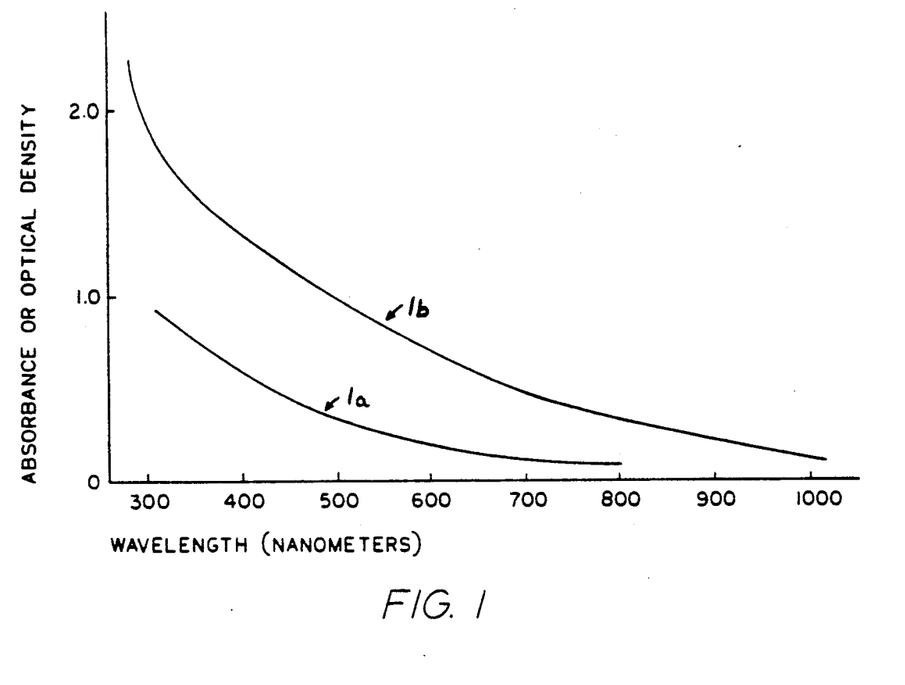
FIG. 1a is a graph showing the absorbance or optical density of a melanin versus the wavelength of the radiation being absorbed.
FIG. 1b is a graph showing the absorbance or optical density of another melanin versus the wavelength of the radiation being absorbed by the melanin.
Figure 2:
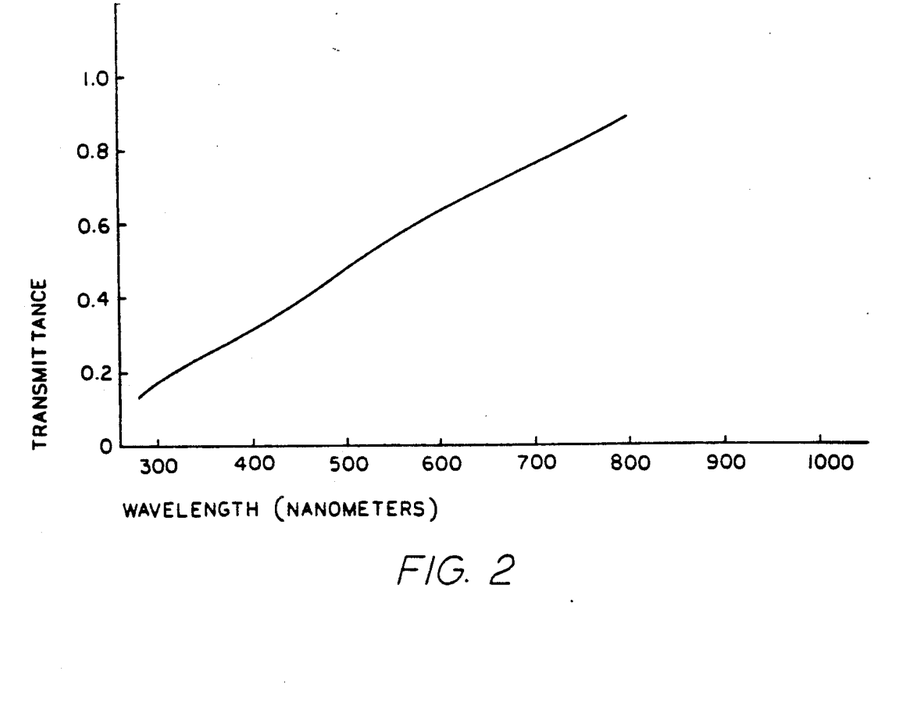
FIG. 2 is a graph that shows the transmittance of the melanin whose absorbance is shown in FIG. 1a versus the wavelength of the radiation.

The terms "transmittance" or "transmission" are also used to describe the same property of melanin or melanin contact lenses and, therefore, they are used interchangeably to describe such properties. Furthermore the terms "transmittance" or "transmission" are related to the terms "absorbance", "optical density" or "absorption" by the following mathematical formula:

Transmittance = Transmission = $10^{-Absorbance}$ = $10^{-Optical\ Density}$ = $10^{-Absorption}$, Referring now to FIG. 1(a) there is shown the absorbance or optical density of L-Dopa acqueous melanin versus the wavelength of the radiation. The concentration of the acqueous melanin is 0.01 milligrams per milliliter. Referring now to FIG. 2 there is shown the transmittance of the acqueous melanin whose absorbance is shown in FIG. 1(a).

FIG. 1(b) shows the absorbance of 0.1 milligrams of sepiomelanin in a 300 milligram KBr pellet. FIG. 1(b) can be found in the book R. A. Nicolaus, *Melanins* (1968), published by Herman, Paris, France (hereinafter referred to as the "Nicolaus Book"). Other graphs showing the absorption or other properties of melanins and a comparison of the absorption or other properties of melanin with those of other substances can be found in that book. Those graphs and the information contained in the Nicolaus Book relating to melanins is incorporated herein by reference.

It is clearly shown in FIGS. 1(a), 1(b), and 2 that the amount of radiation absorbed by the melanin continuously increases as the wavelength of the radiation decreases from the higher wavelengths to the wavelengths wherein the amount of damage is the highest. Because the probability, amount, or severity of retinal damage increases exponentially as the wavelength is decreased from the higher wavelengths toward the ultraviolet region of the spectrum, it is apparent, that the absorption spectrum of melanin is very similar to the action spectrum for the retinal damage or, alternatively, that the percentage of radiation absorbed by melanin increases in the ultraviolet wavelength region wherein the potential of retinal damage increases.

It is also believed by certain authorities in the field, that photochemical damage to the cornea is promoted by oxygen that is present in the cornea or in its vicinity. That oxygen dependence has been disclosed by Zuchlich, Photochem. Photobiol., Volume 25, pages 133-135 (1977). Furthermore, it is believed that when biological molecules are exposed to short wavelength ultra-violet and blue radiation, reactions may occur with oxygen to produce superoxide. Superoxide is also formed by the reaction of oxygen with free melanin radicals that are produced when melanin absorbs light. The term superoxide as used herein is defined as the radical anion of molecular oxygen and is symbolized as $O_2^-$.

It is believed that superoxide is extremely reactive and harmful to biological tissue. Melanin has the ability to react with the superoxide, thereby preventing it from damaging the cornea and/or the lens of the eye. Melanin acts as a superoxide dismutase, i.e., a chemical agent that renders the superoxide harmless through chemical reaction. The melanin is particularly suited as a superoxide dismutase, not only because of its chemical structure, but also, because of the chemical properties of the superoxide. More particularly, superoxide can function either as a chemical oxidant or as a reductant. Because melanin is a redox polymer, it may function in a similar fashion. Accordingly, superoxide is reduced by melanin through one reaction and is oxidized by melanin through another reaction.

The reduction by melanin reaction is:

Because the hydrogen peroxide being produced by the reduction of superoxide by melanin tends to bleach the melanin and to oxidize the cornea, it is preferred that an agent be present to decompose the hydrogen peroxide to oxygen and water. An example of such an agent is copper in the form of ions ($CU^{++}$) bound to the melanin polymer as ligands or chelates. These ions decompose the hydrogen peroxide to oxygen and water. Accordingly, one may prevent the bleaching of the melanin in the lens by incorporating those ions into the lens and by bathing the lens in a copper sulphate solution to replenish the $CU^{++}$ions that are being converted to $CU^+$ions. This solution would also function as a bacteriostat for the lens.

For the purpose of the present description, melanins are defined and classified in the Nicolaus Book. The entire information contained in that book is incorporated herein by reference. As defined in that book, melanins constitute a class of pigments which are widespread in the animal and vegetable kingdoms. While the name melanin in Greek means black, not all melanins as pigments are black but may vary from brown to yellow. Melanins are classified in three groups, namely eumelanins, phaeomelanins and allomelanins. Eumelanins are derived from the precursor tyrosine shown as Compound (1), whereas phaeomelanins are derived from the precursors tyrosine or cysteine shown as Compound (2).

Allomelanins, i.e., other melanins, are formed from nitrogen-free precursors, such as catechol. It is also believed that 1,8-dihydroxynapthalene may produce melanin through enzymatic oxidation. Further information on melanins is found and incorporated herein by reference on page 827, Monograph No. 5629 in The Merck Index (10th Ed. 1983).

Melanin is produced in nature by the oxidative polymerization of the precursors. Furthermore, melanin may be synthesized commercially or in the laboratory from precursors through the free radical polymerization of these precursors. This invention is directed to the use of any melanin regardless as to its source and method of preparation. Therefore, natural, synthetically prepared or any other melanin may be used in accordance with the present invention with hydrophilic contact lenses as described herein.

Examples of synthetically produced melanins from catechol or DOPA precursors are found in the article Froncisz, Sarna, Hyde, *Copper (2+) ion Probe of Metal -ion Binding Sites in Melanin Using Electron Paramagnetic Resonance Spectroscopy. I. Synthetic Melanins.* Arch. Biochem. Biophys., 1980, 202(1) and 289-303. That article is incorporated herein by reference. According to that article, melanin is produced from catechol as follows:

Catechol Melanin. A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove H+ and Cl− ions. The concentration of the melanin suspension was estimated by drying an aliquot in vacuum over phosphorus pentoxide and weighing. Oxidized catechol melanin was prepared by adding 10 mL of $10^{-3}$ M potassium ferricyanide to 30 mg of melanin and incubating for 10 minutes. The suspension was then spun down, washed twice with deionized water and suspended in 5 mL of deionized water.

Examples of enzymatically produced melanin are found, among others, in the following articles:

Blois, Zahlan and Maling, *Electron Spin Resonance Studies on Melanin*, Biophys J. (1964, 4, 71);

Woert, Prasad and Borg, J. Neurochem. (1967, 13,707);

Chauffee, Windle and Friedman, *Electron Spin Resonance Study of Melanin Treated with Reducing Agents*, Biophys. J. (1975, 15, 563-571);

Binns, Chapman, Robson, Swan and Waggott, *Studies Related to the Chemistry of Melanins. Part VIII. The Pyrrol-carboxylic acids formed by oxidation or Hydrolysis of Melanins Derived from 3,4 - dihydroxyphenethylamine or (±) -3,4 dihydroxyphenylalanine*, J. Chem. Soc.(c) (1970, 1128-1133).

These articles are incorporated herein by reference. A typical enzymatic preparation of melanin is disclosed in the Chauffee et. al. article as follows:

A solution of 30 milligrams of purified mushroom tyrosinase (monophenol monooxygenase) in 100 mililiters of Sorensen's buffer of pH of 7 was added to 150 milligrams of L-Dopa (3,4 - dihydroxy phenylalanine) in 500 milliliters of the same buffer solution or to 500 milliliters of a buffer solution saturated with tyrosine. After reaction for two weeks, the precipitated black pigment was filtered, washed with water, and dried over phosphorous pentoxide.

Because of the number of reactive sites in the melanin precursors and their intermediates, the polymerization of the precursors is heterogeneous and the result is an amorphous, highly irregular, three dimensional polymer whose structure cannot be characterized or defined; see, Straves-Mobelli, and Wyler, *Biological Molecular and Clinical Aspects of Pigmentation: Reinvestigation of the Formation of Dopa Melanin: New Aspects of the Antioxidation of Dopa* (12th International Pigment Cell Conference, 1983, 69-77). Furthermore, the number of melanin precursor units in the polymer is not ascertainable. In order to overcome this difficulty, a given melanin is characterized primarily by its precursor and the spectroscopic properties of the melanin rather than by an exact determination of the structure and chemical formula thereof. Accordingly, a melanin is characterized as follows:

1. a polymer of a monomeric melanin precursor
2. a polymer whose monomeric precursors polymerize via a free-radical or an oxidative mechanism
3. a polymer with a broad band optical absorption spectrum as shown in FIGS. 1a and 1b
4. a polymer with a stable free-radical which is often studied through ESR spectrocopy
5. a polymer with a highly conjugated Pi electron system
6. an amorphous, three dimensional, heterogeneous polymer of varying molecular weight.

This characterization is adopted to define the melanins in this invention.

In the present invention the preferred melanin precursors are DOPA (compound (3)) and dopamine (compound (4)) which form eumelanins and catechol (compound (5)) which form allomelanin.

Other known melanin precursors which may be used in the present invention are 5,6-dihydroxyindole; leucodopachrome; tryptamine; serotonin (with an enzyme); 5,6-dihydroxyindole-2-carboxylic acid; epinephrine; norepinephrine; tyrosine, adrenochrome; and 1,8-dihydroxynapthalene (with an enzyme).

In the past, synthetic melanins were prepared by using oxygen to initiate the free-radical polymerization of the precursor in a base and water solution. According to the present invention, however, the polymerization reaction may also be initiated in solvents other than water using a free-radical initiator. The free-radical initiator is chosen by considering its solubility properties and the desired reaction kinetics. The most preferred free-radical initiator is benzoyl peroxide. Other preferred free-radical initiators are di-tert-butyl peroxide and di(1-cyano-1-methyl ethyl) diazene (azobisisobutyronitrile). Still other initiator systems include other peroxides, azo compounds, redox pairs, photochemical systems, perborates, percarbonates and radiation. The solvents that may be used, other than water, are organic solvents, such as dimethyl sulfoxide (DMSO), chloroform, toluene, acetonitrile, methylene chloride, 1,2-dichloroethane, alcohols, glycol, etc.

According to the present invention, three methods are preferred for preparing a melanin containing hydrophilic contact lens. In the first method, previously prepared melanin is adhered to a previously prepared clear hydrophilic contact lens. The melanin is prepared by well-known techniques utilizing a melanin precursor. Examples of such preparation are disclosed and described in U.S. Pat. No 4,698,374, issued on Oct. 6, 1987, which is incorporated herein by reference and in the aforementioned book by Nicolaus. The clear hydrophilic contact lens is prepared by polymerizing well-known hydrophilic monomers routinely used in the preparation of hydrophilic, i.e., soft, contact lenses. The hydrophilic properties of those monomers are attributed to the presence of —OH and —COOH functional groups. Examples of such monomers are 2-hydroxyethyl methacrylate, otherwise known as HEMA, and methacrylic acid. It should be noted that melanin has hydrophilic properties, also. According to this method, the melanin is applied or adhered to the surface of the lens by contacting that surface with the melanin. The melanin may be applied to the interior surface of the contact lens, i.e., the surface adjacent to the cornea, the exterior surface thereof, both surfaces, or portions thereof. It should be understood, however, that, in order to utilize the melanin as a superoxide dismutase, the melanin must be applied to, at least, the interior surface of the lens, whereby the melanin is placed in the vicinity of the superoxide formation area.

Although melanin may be adhered to the surface of the clear lens by any well known physical or chemical techniques, it is preferred that a procedure be used wherein a chemical covalent bond is formed between the polymeric material of the clear hydrophilic lens and the melanin to produce a chemically stable, heat resistive lens that is not susceptible to leaking or bleeding when the lens is sterilized. This is accomplished by preparing the hydrophilic lens by polymerizing at least one monomer that contains one or more nucleophilic functional groups capable of reacting with the melanin after the polymerization of the monomer. Common nucleophilic functional groups present in hydrophilic contact lens material are the carboxyl, hydroxyl, amino, amido and mercapto groups. Monomers bearing those functional groups include, but are not limited to, hydroxyalkyl esters of polymerizable unsaturated acids, such as acrylic, methacrylic, itaconic, fumaric and maleic acids. One of those esters that has been used extensively for the preparation of hydrophilic lenses is 2-hydroxyethyl methacrylate (HEMA).

Because the presence of these exoskeletal functional groups alone is not sufficient to initiate and complete the covalent bond between the melanin and the polymeric material, coupling agents are utilized to activate either the functional groups that are present in the polymeric backbone or the functional groups that are present in the melanin. Those coupling agents include, but are not limited to, carboxyl activating reagents such as substituted carbodimides, bis-substituted phosphinic chlorides, carbonyl diimidazoles, activating esters, acid halides, and anhydrides. The activated hydroxyl or carboxyl groups on the polymer backbone of the hydrophilic lens will couple with amino or hydroxyl groups on the melanin to produce chemically stable, heat resistive ester, amide or carbonate covalent linkages. Alternatively, activated carboxyl groups present on the melanin couple with hydroxyl, amino, amido or mercapto functional groups present on the polymer backbone. Either alternative can be employed to covalently couple melanin to a hydrophilic lens polymeric material.

If it is desirable to produce a melanin containing hydrophilic lens being tinted in the center of the lens and having a clear untinted edge, well known techniques such as the one disclosed in U.S. Pat. No. 4,553,975 may be used to seal the area of the lens that must remain clear and to expose the unsealed areas to the melanin for tinting.

In certain instances it may not be desirable or possible to form a covalent bond directly between the melanin and the functional groups on the backbone of the polymer because such bond is sterically hindered. Instead, aliphatic, aromatic or combined aliphatic and aromatic linkage or cross-linking agents may be used. These cross-linking agents have on one end of the linking arm, an activated group, such as a carboxyl derivative, isothiocyanate or other electrophilic species suitable for forming a chemical bond with the functional groups that are present on the polymer backbone and, on the other end, a nucleophilic group, such as hydroxyl, amino, amido, mercapto or carboxyl, that is suitable for forming a covalent bond with the activated melanin in the form of an amide, ester, or ether.

A variety of dyes may be used together with melanin to vary the degree of coloration of the contact lens. Although many well known methods of incorporating dye in hydrophilic contact lenses may be used, it is preferred, that reactive dyes that contain nucleophilic functional groups capable of forming covalent bonds with the exoskeletal functional groups of the lens be used together with coupling reagents that are similar to the ones referred to hereinabove.

Melanin-containing hydrophilic contact lenses may also be prepared by contacting or mixing, melanin that is separately prepared, as previously described, with a monomer that is suitable for the preparation of hydrophilic polymeric material before the monomer is polymerized, in a suitable solvent such as dimethyl sulfoxide, chloroform, toluene, acetonitrile, methylene chloride, 1,2-dichloroethane, etc. The mixture is then polymerized by free-radical polymerization to form a hydrophilic contact lens wherein the melanin is uniformly dispersed throughout the matrix of the lens. In order to obtain a stable lens, it is preferred, that the monomer contain the previously described functional groups that are suitable for the formation of covalent bonds, directly or indirectly, between the monomer and the melanin. More particularly, the precursor must contain carboxyl, hydroxyl, amino, amido or mercapto groups that can form covalent bonds with melanin, directly or through the use of cross-linking agents, following activation by coupling activating agents that were previously described. In the preparation of the melanin-containing lens by this method, as well as in the preparation by the previous method, the degree of melanin incorporation may be controlled by varying the contact time and/or the relative reactivity of the reagents.

A melanin containing hydrophilic lens may also be prepared according to the present invention by incorporating melanin into the lens as a co-polymer. More particularly, a melanin precursor is dissolved in a liquid monomer that is suitable for the preparation of a hydrophilic polymeric material. An initiator suitable for initiating the co-polymerization reaction of the melanin and the monomer is added and the solution is heated. Suitable initiators include the aforementioned initiators of the polymerization reaction of melanin precursors such as benzoyl peroxide, etc. The resultant product is a solid, visibly transparent, hydrophilic lens having melanin uniformly dispersed therein in a non-aggregated form.

Alternative procedures for sequestering the melanin to make it soluble in various monomers for copolymerization includes using bisfunctional agents such as allyl, methallyl, or vinyl chloroformates; methacryl chloride; methacryl oxypropyl dimethyl chloro silane; isocyanatoethyl methacrylate; and other agents containing a free radical polymerizable group as well as a chemical reactive group that can be reacted with carboxyl or phenolic functional groups on the melanin. Furthermore, similar reagents that can not enter into a copolymerization with the monomer plastic can also be used as flushing or solubilizing agents. In the latter case, the melanin will not be covalently incorporated into the ultimate polymer but will only be sequestered and physically trapped in the polymer matrix.

The following examples further illustrate the invention, but are not to be construed as limitations on the scope of the apparatus and the method contemplated herein.

EXAMPLE 1

Figure 3:
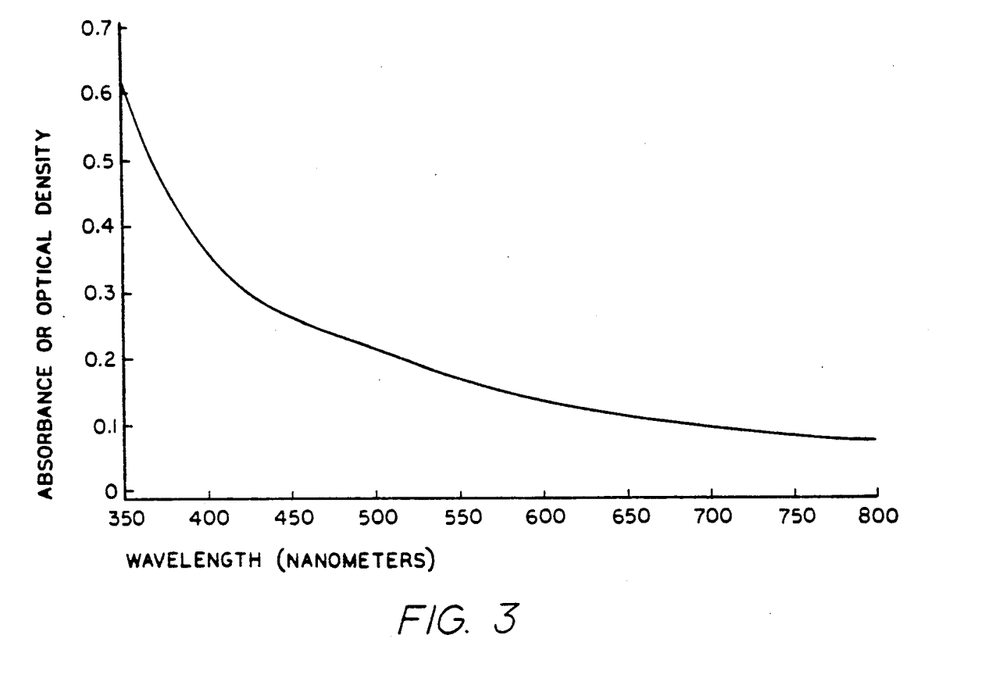
FIG. 3 is a graph showing the absorbance or optical density of a melanin hydrophilic contact lens versus the wavelength of the radiation being absorbed.
Figure 4:
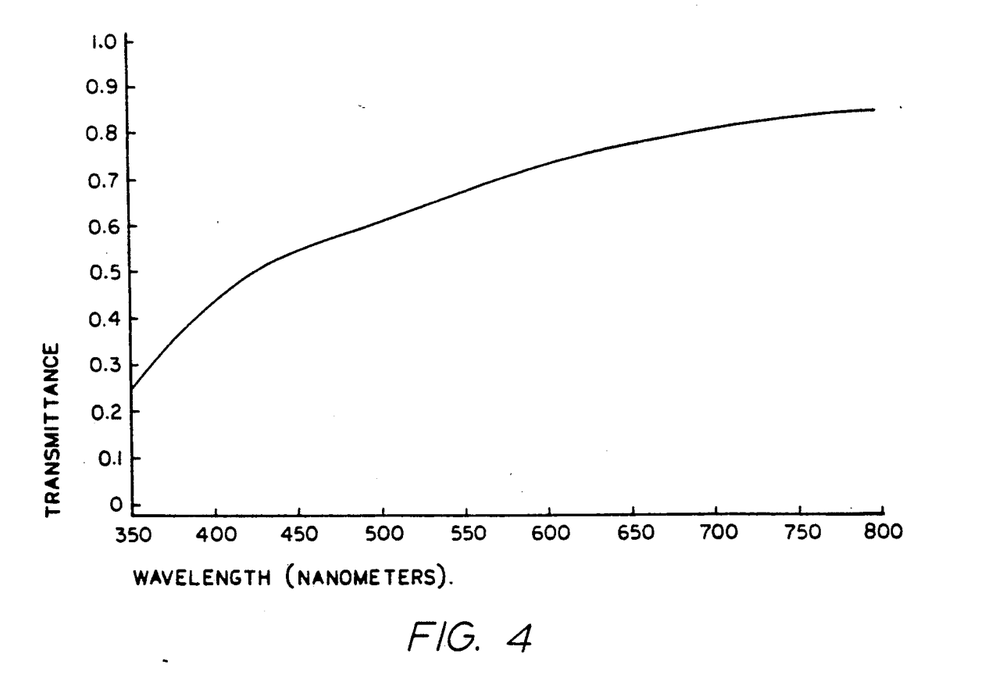
FIG. 4 is a graph showing the transmittance of the melanin lens whose absorbance is shown in FIG. 3 versus the wavelength of the radiation.

A hydrophilic contact lens previously prepared by the polymerization of 2-hydroxyethyl methacrylate (HEMA) was soaked in a 1.0M Sodium Carbonate solution for one hour. The lens was then washed with deionized water and was placed into a solution (4.0 milliliters) composed of previously prepared melanin (0.4 grams) and 1-ethyl-3-(3-dimethylaminopropyl) carbodiimide (0.70 grams) in a phosphate buffer solution, having a pH of 7.8. The lens remained in the solution for two hours at room temperature. Then, the lens-containing solution was heated at 75° C. for one hour and was left undisturbed to cool overnight. The melanin adhered to the lens. Following, the melanin containing lens was washed with a neutral buffered (pH of 7) saline solution until the solution showed no absorption at 400 nanometers. The melanin - HEMA lens was washed with methanol and again examined for leaching of melanin. The final lens was boiled in distilled water for one hour to remove any traces of methanol. The lens was stored in a sterile buffered saline solution. The resultant lens was a tinted lens having an absorption spectrum substantially similar to the one shown in FIG. 3 and a transmittance spectrum shown in FIG. 4. The thickness of the lens was approximately 2 millimeters.

EXAMPLE 2

The previous procedure was repeated except for the fact that the edges of the lens were covered by a device that sealed those edges from exposure to the melanin and the activating reagent. The resultant product was a lens having a tinted center and a clear edge. This is a theoretical example.

EXAMPLE 3

Figure 5:
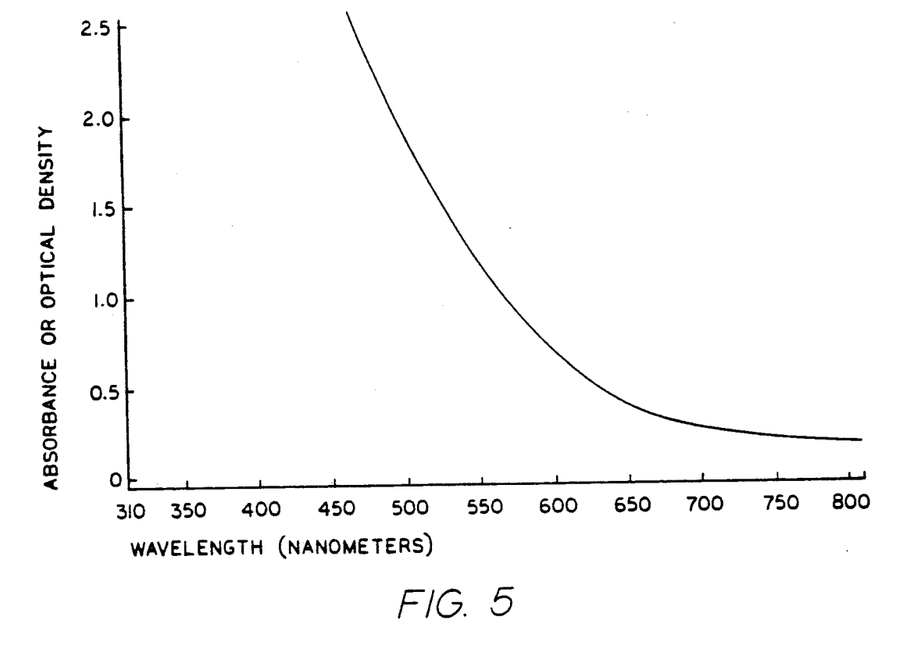
FIG. 5 is a graph showing the absorbance or optical density of another melanin hydrophilic contact lens versus the wavelength of the radiation being absorbed.
Figure 6:
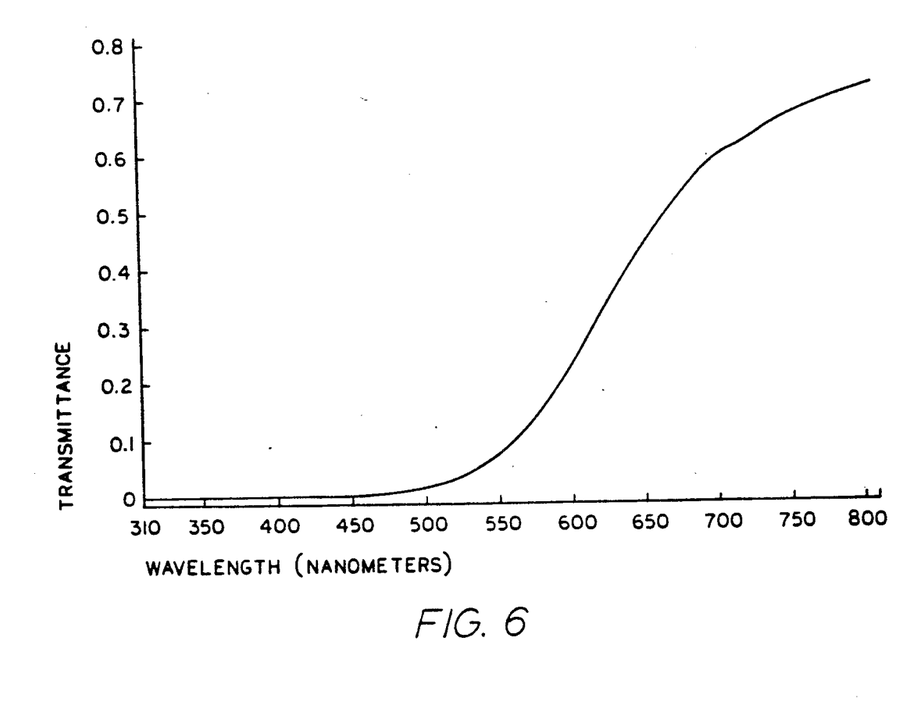
FIG. 6 is a graph showing the transmittance of the contact lens whose absorbance is shown in FIG. 5 versus the wavelength of the radiation.

Benzoyl peroxide (150 milligrams) was added to 2-hydroxyethyl methacrylate (10 milliliters). The mixture was poured into a test tube, sealed and heated to 55° C. for 24 hours. The resultant product was a clear, transparent, soft, hydrophilic plastic. Thin plastic strips having a thickness of about 1 millimeter were cut out from the plastic and were placed into a concentrated solution of low molecular weight melanin granules prepared as in Example 4. The system was then heated at 90° C. for 24 hours. At the end of that period the system was cooled. The strips of hydrophilic plastic were imbedded with melanin. The thickness of the lens was 2 millimeters. The absorption spectrum of the plastic is shown in FIG. 5 and its transmission spectrum is shown in FIG. 6.

EXAMPLE 4

Figure 7:
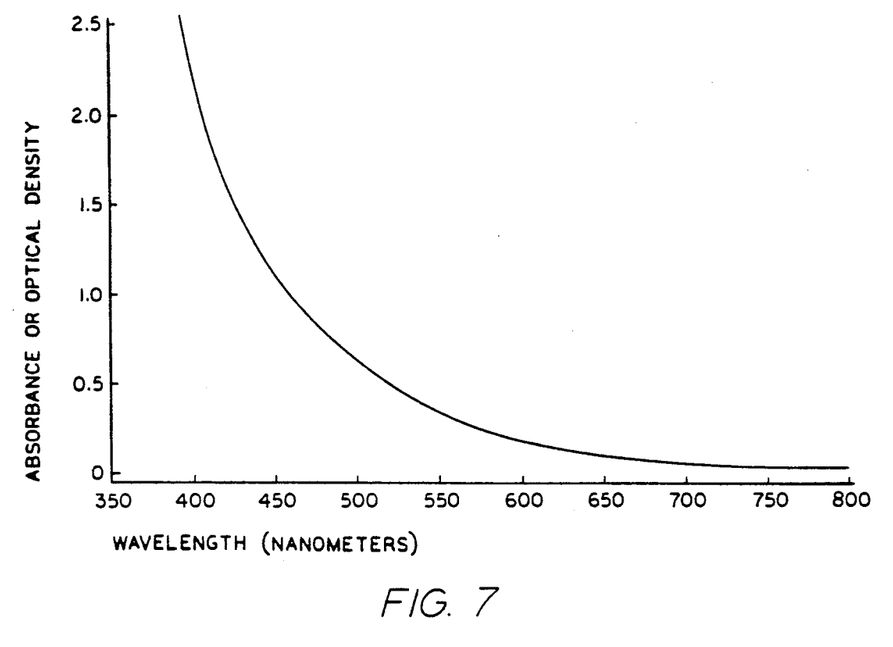
FIG. 7 is a graph showing the absorbance or optical density of another melanin hydrophilic contact lens versus the wavelength of the radiation being absorbed.
Figure 8:
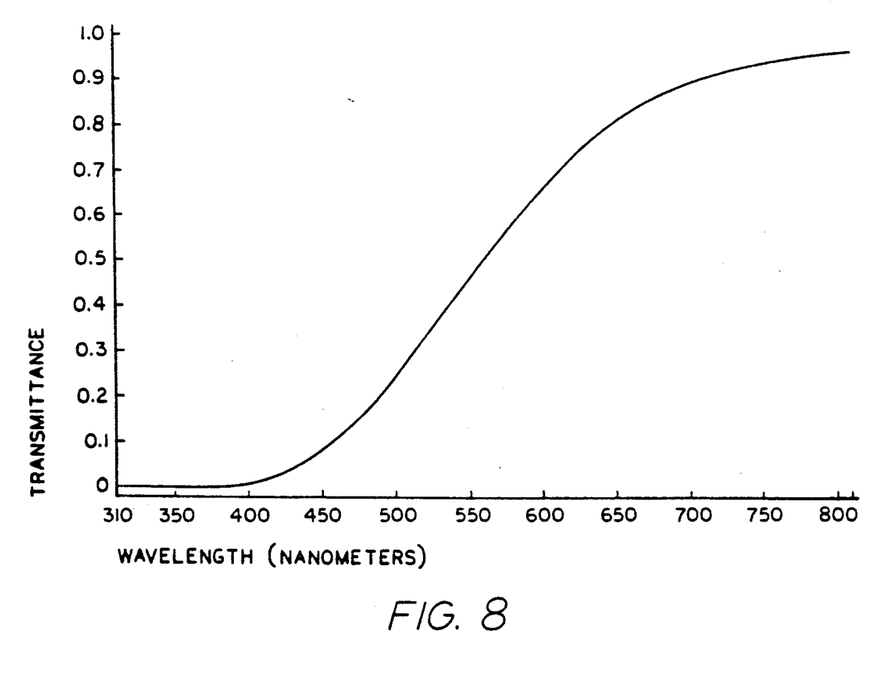
FIG. 8 is a graph showing the transmittance of the contact lens whose absorbance is shown in FIG. 7 versus the wavelength of the radiation.

Benzoyl peroxide (2.6 grams) was dissolved in acetonitrile (150 milliliters). The solution was heated to 65° C. Catechol (6.0 grams) was then dissolved in the solution and was followed by the addition of triethyl amine (1.5 milliliters). The solution was continuously heated at 65° C. for about 16 hours. At the end of that period, the solution was cooled and then filtered with a 0.4 micron filter paper. The filtered content was poured in open dishes and the acetonitrile was allowed to evaporate. The residue was a concentrated solution of low molecular weight melanin granules. Melanin residue (4.0 grams) was dissolved in 2-hydroxyethyl methacrylate liquid (20 milliliters). Then, 1-ethyl-3(3-dimethylaminopropyl) carbodiimide (1.0 gram) was added and the mixture was stirred for 24 hours to form a solution. A portion of that solution (660 microliters) was combined with 2-hydroxyethyl methacrylate (2 milliliters). Then, the mixture was filtered. Then, benzoyl peroxide (0.124 grams) was added. The solution was heated, in sequence, at 85° for 15 minutes, at 90° C. for 15 minutes, at 95° C. for 15 minutes, at 100° C. for 15 hours, at 105° C. for 15 minutes, at 110° C. for 15 minutes and at 115° C. for 15 minutes. Then, it was allowed to cool at room temperature. The resultant product was a dark golden brown transparent melanin soft contact lens having an absorption spectrum shown in FIG. 7 and a transmission spectrum shown in FIG. 8. The thickness of the lens was 2 millimeters.

EXAMPLE 5

Figure 9:
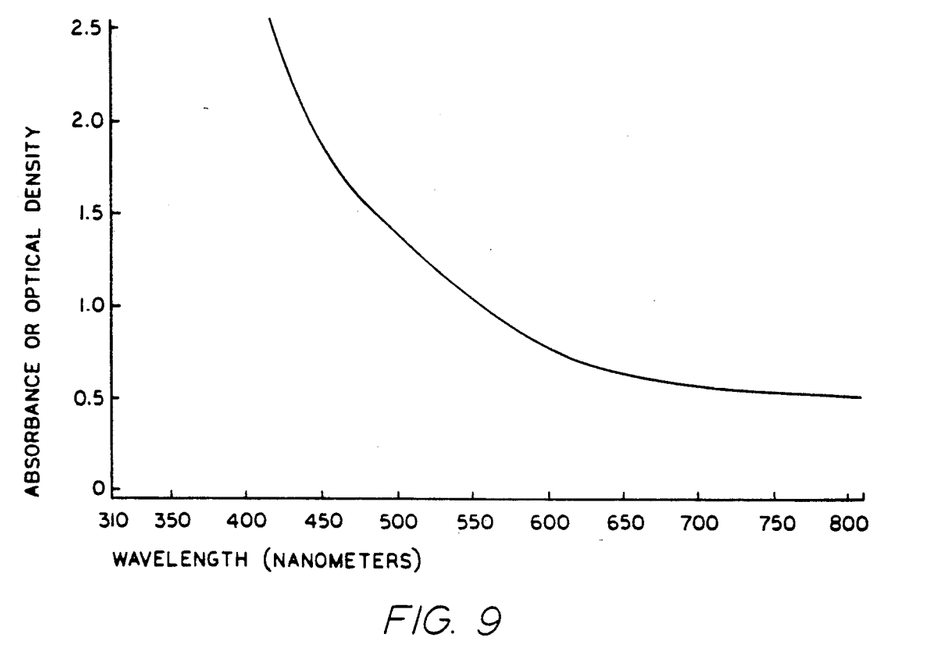
FIG. 9 is a graph showing the absorbance or optical density of another melanin hydrophilic contact lens versus the wavelength of the radiation being absorbed.
Figure 10:
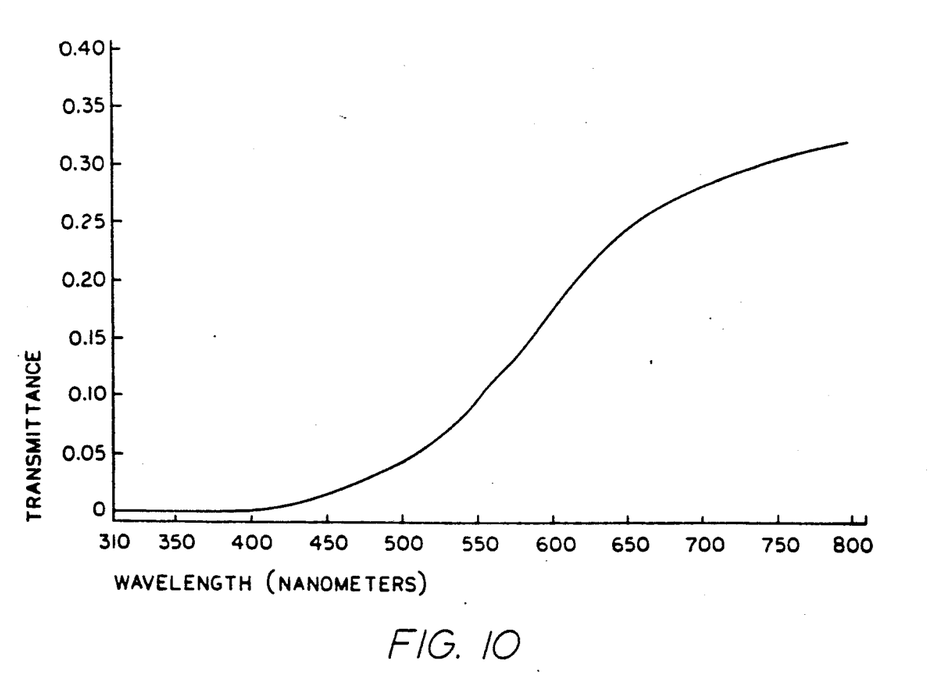
FIG. 10 is a graph showing the transmittance of the contact lens whose absorbance is shown in FIG. 9 versus the wavelength of the radiation.

Benzoyl peroxide (2.6 grams) was dissolved in acetonitrile (150 milliliters). The solution was heated to 65° C. Catechol (6.0 grams) was then dissolved in the solution and was followed by the addition of triethyl amine (1.5 milliliters). The solution was continuously heated at 65° C. for about 16 hours. At the end of that period, the solution was cooled and then filtered with a 0.4 micron filter paper. Filtered material (5.0 milliliters) was mixed with 1-ethyl-3(3-dimethylaminopropyl) carbodiimide (130 milligrams). Following the mixture was combined with 2-hydroxyethyl methacrylate liquid (10 milliliters). Furthermore azobisisobutyronitrile (300 milligrams) was added to the mixture. The resultant mixture was heated in an oven at 60° C. The acetonitrile was evaporated and the 2-hydroxyethyl methacrylate monomer was polymerized to incorporate the melanin into the matrix and to form a melanin-containing thin soft contact lens. The absorption spectrum of the lens is shown in FIG. 9 and its transmission spectrum is shown in FIG. 10. The thickness of the lens was 2 millimeters.

EXAMPLE 6

Figure 11:
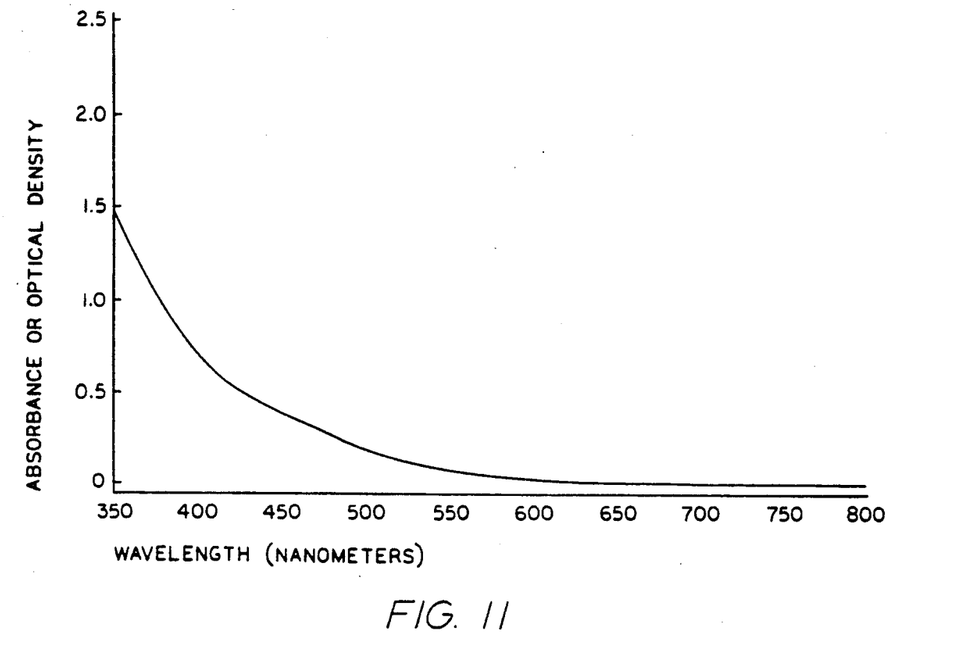
FIG. 11 is a graph showing the absorbance or optical density of another melanin hydrophilic contact lens versus the wavelength of the radiation being absorbed.
Figure 12:
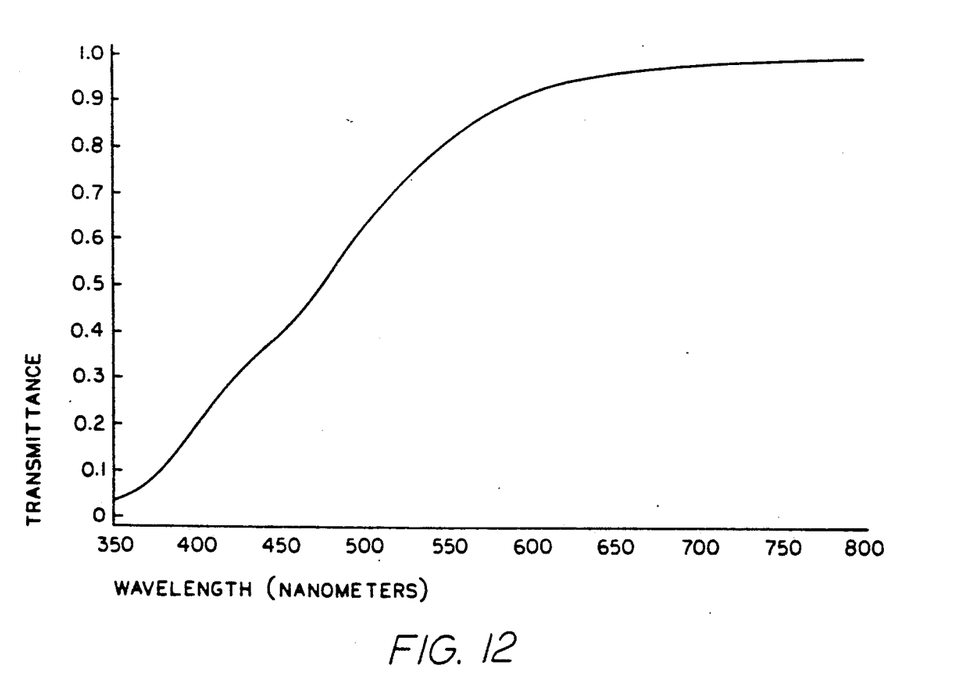
FIG. 12 is a graph showing the transmittance of the contact lens whose absorbance is shown in FIG. 11 versus the wavelength of the radiation.

Benzoyl peroxide (150 milligrams) was dissolved in 2-hydroxyethyl methacrylate monomer (10 milliliters). L-Dopa (15 milligrams) was also dissolved in the monomer. Then, triethyl amine (80 microliters) was added. The solution was stirred for 24 hours. Then, the solution was poured into a cylindrical mold, sealed and heated, in sequence, at 40° C. for 30 minutes, at 45° C. for 15 minutes, at 50° C. for 15 minutes, at 55° C. for 15 minutes, at 60° C. for 30 minutes, at 65° C. for 1 hour and at 100° C. for 1 hour. The result was a solid plastic with a golden brown color that was optically clear and transparent. The absorption spectrum of the plastic is shown in FIG. 11 and its transmission spectrum is shown in FIG. 12. The thickness of the lens was 2 millimeters.

EXAMPLE 7

Aqueous L-Dopa melanin (4.0 milliliters) having a concentration of 1 milligram per milliliter was reacted, in the presence of excess triethylamine (1.0 milliliter), with methacryloyl chloride (1.0 milliliter) by dropwise addition until no further precipitate was formed. The solution was extracted with tetrahydrofuran (THF) and the melanin soluble organic phase was dried over magnesium sulfate and filtered by vacuum. The derivatized melanin/THF solution was concentrated by evaporation. Concentration by evaporation, however, is not required to use this melanin in connection with this invention.

EXAMPLE 8

The procedure of Example 7 was repeated except for the fact that 4.0 milliliters of acetonitrile catechol melanin having a concentration of 1 milligram per milliliter was used instead of aqueous L-Dopa melanin and after addition of the methacryloyl chloride, the solution was filtered to remove the hydrochloride salt of the thriethylamine. Concentration by evaporation, however, is not required to use this melanin in connection with this invention.

EXAMPLE 9

Figure 13:
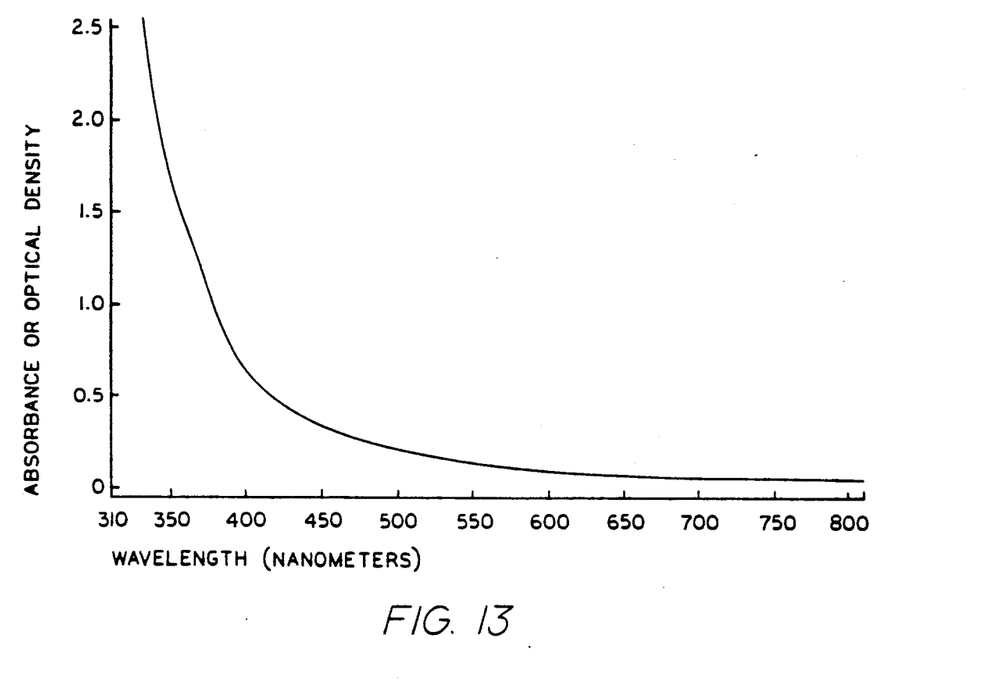
FIG. 13 is a graph showing the absorbance or optical density of another melanin hydrophilic contact lens versus the wavelength of the radiation being absorbed.
Figure 14:
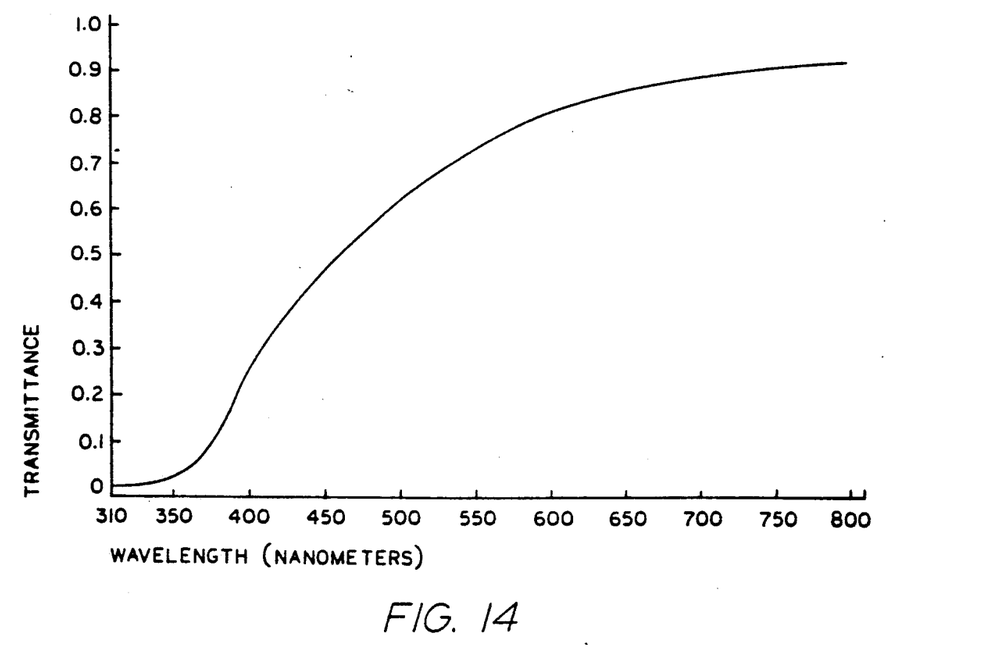
FIG. 14 is a graph showing the transmittance of the contact lens whose absorbance is shown in FIG. 13 versus the wavelength of the radiation.

Benzoyl peroxide (9.0 milligrams) was added to 2-hydroxyethyl methacrylate (2.1 grams or 2.0 milliliters) of form a solution. An aliquot of aqueous L-Dopa melanin (0.19 milligrams) derivatized with methacryloyl chloride as described in Example 7, was added to the solution. Polymerization was achieved by heating the solution, in sequence, at 50° C. for 15 minutes, at 55° C. for 15 minutes, at 60° C. for 30 minutes, and 65° C. for one hour, and at 100° C. for one hour. The HEMA polymer containing the derivatized L-Dopa melanin was golden brown. A sample having a thickness of 2.0 millimeters had on absorption spectrum shown in FIG. 13 and a transmittance spectrum shown in FIG. 14.

EXAMPLE 10

Figure 15:
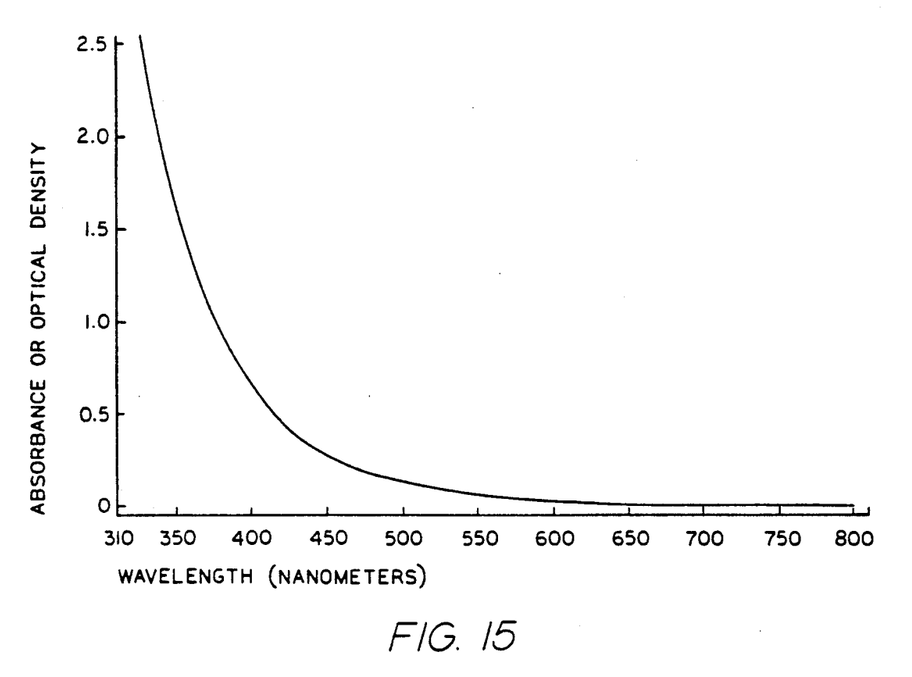
FIG. 15 is a graph showing the absorbance or optical density of another melanin hydrophilic contact lens versus the wavelength of the radiation being absorbed.
Figure 16:
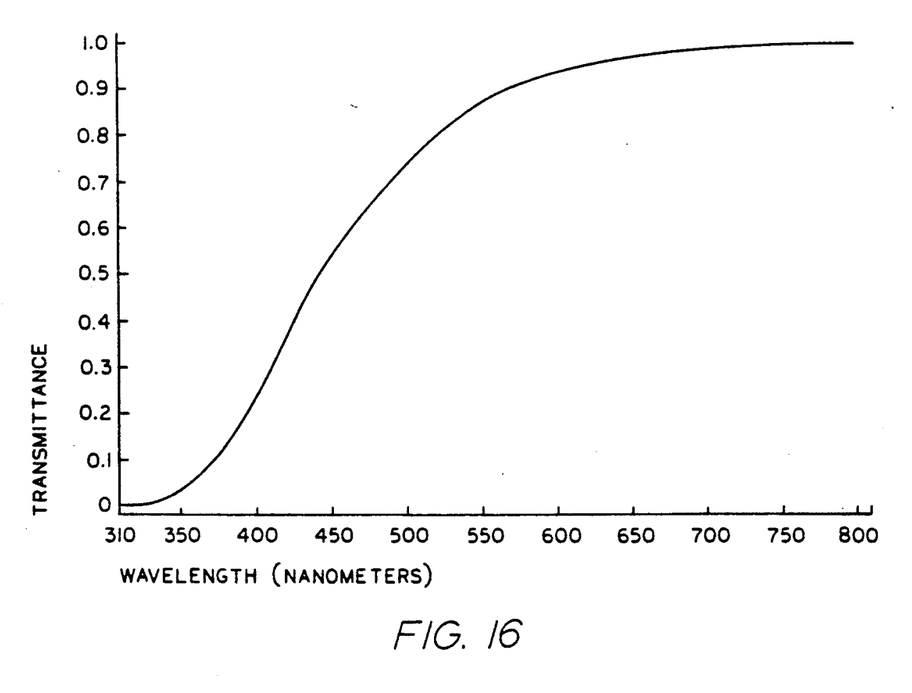
FIG. 16 is a graph showing the transmittance of the contact lens whose absorbance is shown in FIG. 15 versus the wavelength of the radiation.

Ethyl ketone peroxide (0.53 grams) was added to HEMA (2.1 grams). An aliquot of acetonitrile catechol melanin (0.65 milligrams) derivatized with methacryloyl chloride as described in Example 8 was added to the solution. Polymerization was achieved by heating the solution, in sequence, at 50° C. for 15 minutes, at 55° C. for 15 minutes, at 60° C. for 30 minutes, at 65° C. for one hour, and at 100° C. for one hour. The HEMA polymer containing the derivatized catechol melanin had a brown color. A 2 millimeter thick sample of the HEMA polymer had an absorption spectrum shown in FIG. 15 and a transmittance spectrum shown in FIG. 16

Although the invention is described with respect to specific embodiments and modifications, the details hereof are not to be construed as limitations, except to the extent indicated in the following claims.

What is claimed is:

1. A hydrophilic contact lens, comprising:
   a polymeric material formed by the polymerization of a monomer; and
   melanin connected to the polymeric material by a chemical covalent bond.

2. A hydrophilic contact lens according to claim 1 wherein the chemical covalent bond between the melanin and the polymeric material is formed after the polymerization of the monomer.

3. A hydrophilic contact lens according to claim 1 wherein the melanin is connected to the surface of the polymeric material.

4. A hydrophilic contact lens according to claim 2 wherein the monomer contains a nucleophilic functional group capable of reacting with the melanin to form the covalent bond after the polymerization of the monomer.

5. A hydrophilic contact lens according to claim 4 wherein the nucleophilic functional group is a member selected from the group consisting of carboxyl, hydroxyl, amino, amido and mercapto groups.

6. A hydrophilic contact lens according to claim 4 wherein the monomer is a hydroxyalkyl ester of a polymerizable unsaturated acid, the polymerizable unsaturated acid being a member selected from the group consisting of acrylic, methacrylic, itaconic, fumaric and maleic acids.

7. A hydrophilic contact lens according to claim 1 wherein the covalent bond is formed through activation by a coupling agent.

8. A hydrophilic contact lens according to claim 7 wherein the coupling agent is a carboxyl activating reagent.

9. A hydrophilic contact lens according to claim 8 wherein the carboxyl activating reagent is a member selected from the group consisting of substituted carbodimides, bis-substituted phosphinic chlorides, carbonyl diimidazoles, activating esters, acid halides and anhydrides.

10. A hydrophilic contact lens according to claim 1 wherein the chemical covalent bond connecting the melanin and the polymeric material is formed between the melanin and the monomer prior to the polymerization of the monomer.

11. A hydrophilic contact lens according to claim 10 wherein the monomer contains a nucleophilic functional group capable of reacting with the melanin to form the covalent bond before the polymerization of the monomer.

12. A hydrophilic contact lens according to claim 11 wherein the nucleophilic functional group is a member selected from the group consisting of carboxyl, hydroxyl, amino, amido and mercapto group.

13. A hydrophilic contact lens according to claim 10 wherein the covalent bond is formed through activation by a coupling agent.

14. A hydrophilic contact lens, comprising:
    a polymeric material formed by the polymerization of a monomer;
    a cross-linking agent connected to the polymeric material by a first covalent bond; and
    melanin connected to the cross-linking agent by a second covalent bond.

15. A hydrophilic contact lens according to claim 14 wherein the first covalent bond is formed after the polymerization of the monomer.

16. A hydrophilic contact lens according to claim 15 wherein, prior to the formation of the first covalent bond, the cross-linking agent has an electrophilic species suitable for forming the first covalent bond with a functional group present on the polymeric material.

17. A hydrophilic contact lens according to claim 14 wherein the first covalent bond is formed between the cross-linking agent and the monomer prior to the polymerization of the monomer.

18. A hydrophilic contact lens according to claim 17 wherein, prior to the formation of the first covalent bond, the cross-linking agent has an electrophilic species suitable for forming the first covalent bond with a functional group present on the monomer.

19. A hydrophilic contact lens according to claim 14 wherein, prior to the formation of the second covalent bond, the cross-linking agent has a nucleophilic group that is suitable for forming the second covalent bond with the melanin.

20. A hydrophilic contact lens, comprising:
    a polymeric material formed by the polymerization of a monomer;
    melanin; and a reagent being chemically attached to the melanin through a covalent bond to make the melanin derivatized melanin so that the melanin is more soluble in the monomer prior to the polymerization of the monomer, the derivatized melanin being connected to the material.

21. A hydrophilic contact lens according to claim 20 wherein the reagent contains a free radical polymerizable group which copolymerizes with the monomer.

22. A hydrophilic contact lens according to claim 20 wherein a reagent is a bisfunctional reagent.

23. A hydrophilic contact lens according to claim 20 wherein the reagent does not copolymerize with the monomer and the derivatized melanin is physically trapped in the material.

24. A hydrophilic contact lens according to claim 20 wherein, prior to the formation of the covalent bond, the reagent includes a chemical reactive group that can be reacted with carboxyl or phenolic functional groups on the melanin to form the covalent bond.

25. A hydrophilic contact lens, comprising:
a polymeric material formed by the polymerization of a monomer;
melanin; and
a reagent which physically traps the melanin to make the melanin sequestered melanin so that the melanin is more soluble in the monomer prior to the polymerization of the monomer, the sequestered melanin being connected to the material.

26. An apparatus according to claim 25 wherein the reagent is a flushing agent.

27. An apparatus according to claim 25 wherein the reagent is a solubilizing agent.

28. A soft contact lens prepared by a process comprising the steps of:
combining melanin with a hydrophilic polymer; and
forming a covalent bond between the melanin and the hydrophilic polymer.

29. A soft contact lens prepared by the process according to claim 28 further including the step of activating the hydrophilic polymer by a coupling agent, prior to the step of forming the covalent bond, to initiate and complete the covalent bond.

30. A soft contact lens prepared by the process according to claim 28 further including the step of activating the melanin by a coupling agent, prior to the step of forming the covalent bond, to initiate and complete the covalent bond.

31. A soft contact lens prepared by a process comprising the steps of:
combining melanin with a hydrophilic monomer;
forming a covalent bond between the melanin and the monomer; and
polymerizing the monomer.

32. A soft contact lens prepared by the process according to claim 31 further including the step of activating the hydrophilic monomer or the melanin by a coupling agent, prior to the step of forming the covalent bond, to initiate and complete the covalent bond.

33. A soft contact lens prepared by a process comprising the steps of:
reacting melanin with a reagent to form derivatized melanin wherein a covalent bond is formed between the reagent and the melanin;
mixing the derivatized melanin with a hydrophilic monomer; and
polymerizing the hydrophilic monomer.

34. A soft contact lens prepared by the process according to claim 33 wherein the reagent includes:
a chemical reactive group which reacts with the melanin to form the covalent bond; and
a free radical polymerizable group which copolymerizes with the hydrophilic monomer.

35. A soft contact lens prepared by a process comprising the steps of:
mixing melanin with an agent to physically trap the melanin to physically sequester the melanin;
combining the physically sequestered melanin with a hydrophilic monomer; and
polymerizing the hydrophilic monomer.

* * * * *